July 24, 1928.
E. J. KEARNEY
1,678,050
ADJUSTABLE FLUID CONTROL DEVICE
Filed June 7, 1926  3 Sheets-Sheet 1
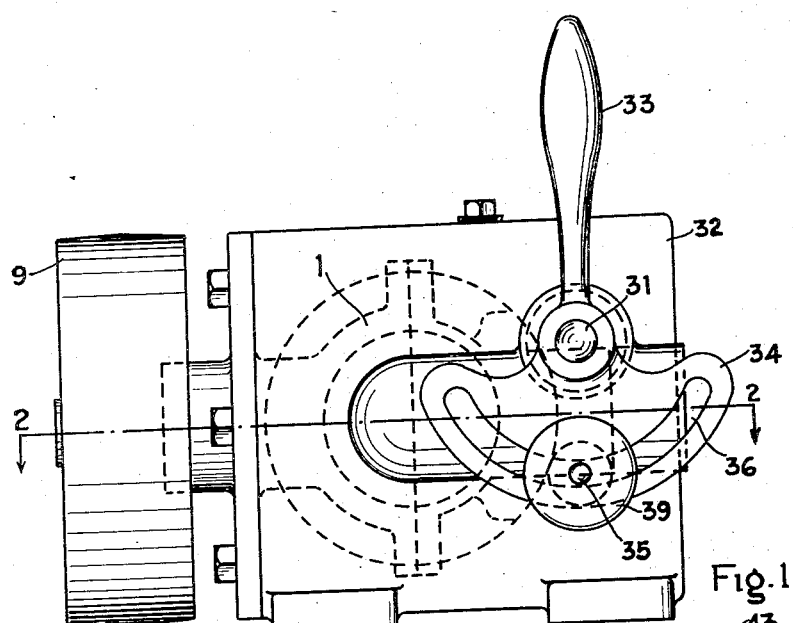
Fig.1
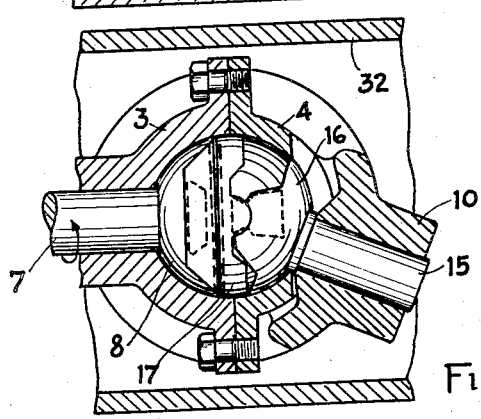
Fig.6
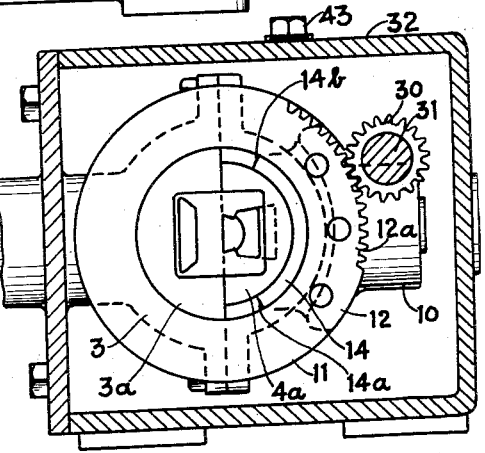
Fig.8
Fig.7
INVENTOR
Edward J Kearney
BY
Fred G Parsons
ATTORNEY July 24, 1928.

E. J. KEARNEY 1,678,050

ADJUSTABLE FLUID CONTROL DEVICE

Filed June 7, 1926      3 Sheets-Sheet 2

July 24, 1928.

E. J. KEARNEY 1,678,050

ADJUSTABLE FLUID CONTROL DEVICE

Filed June 7, 1926  3 Sheets-Sheet 3

0–360°

90°

180°

270°

INVENTOR
Edward J Kearney
BY
Fred A Parsons
ATTORNEY

Patented July 24, 1928.

1,678,050

UNITED STATES PATENT OFFICE.

EDWARD J. KEARNEY, OF WAUWATOSA, WISCONSIN, ASSIGNOR TO KEARNEY & TRECKER CORPORATION, OF WEST ALLIS, WISCONSIN, A CORPORATION.

ADJUSTABLE FLUID-CONTROL DEVICE.

Application filed June 7, 1926. Serial No. 114,116.

This invention relates to fluid control devices such as pumps and motors and more particularly to an improved form thereof, capable of adjustment whereby the device when used as a pump may deliver a volume of fluid variable in accordance with the adjustment of the device while maintaining a given rate of actuation of the device; or when used as a motor may actuate other mechanism at rates variable in accordance with the adjustment of the device while maintaining a substantially constant rate of fluid flow through the device.

An important object is to provide a fluid control device such as a pump or motor having alternately expanding and contracting chambers, in which the capacity of displacement of the chamber or chambers during a cycle of expansion and contraction may be varied from maximum to minimum in accordance with the adjustment of the device, and with substantially an infinite number of intermediate adjustments.

A further purpose is to provide a fluid control device such as a pump or motor in which adjustment is possible to give a maximum operative effect in either direction, or any intermediate effect in either direction, whereby the device when operated as a pump having a uniform rate of actuation in a given direction may be adjusted to deliver its maximum or any intermediate volume of fluid in either direction, and when used as a motor having a substantially uniform flow of fluid through the device in a given direction may be adjusted to be actuated at a maximum or any intermediate rate in either direction.

Another object is to provide a variable or adjustable form of fluid pump or motor in which the fluid capacity in a maximum position of adjustment is large in comparison with the space occupied, although adjustable to vary the capacity from maximum to minimum.

Another object is to provide an adjustable flow form of fluid pump or motor in which an expanding and contracting chamber is put into communication with suitable inlet and outlet ports at the proper time without the use of auxiliary valve or port operating mechanism, the effect being obtained by an improved form, relationship and operation of the parts.

Another object is to provide an adjustable flow fluid pump or motor having a substantially non-pulsating flow of fluid through the device in any position of its adjustment in either direction.

A further object is generally to simplify and improve the construction and operation of a device adapted to be used either as a fluid pump when power is applied to operate the device, or as a fluid motor from which power may be derived when fluid under pressure is suitably applied to actuate the device, and which is capable of adjustment whereby different operative effects varying from a maximum in one direction to a maximum in the other and through all intermediate stages in either direction may be had in either instance.

Other objects will be apparent from the accompanying drawings, description and claims.

The invention consists in certain novel features of construction and arrangement and in the combination of parts as hereinafter particularly described and claimed. In the accompanying drawings, the same reference characters are used to designate the same parts in each of the several views.

Fig. 1 is a front elevation of a device incorporating my invention.

Fig. 2 is a sectional view of the same device along line 2—2 of Fig. 1.

Fig. 3 is a vertical section through the device along line 3—3 of Fig. 2.

Fig. 4 is a transverse partial section along line 4—4 of Fig. 2.

Fig. 5 is a transverse section along line 5—5 of Fig. 2.

Fig. 6 shows a portion of the mechanism to the left in Fig. 3, but in a central position of adjustment, the position of adjustment shown in Fig. 3 being the extreme in the one direction.

Fig. 7 illustrates the same portion of the mechanism but to the extreme of its adjustment in the other direction.

Figs. 9, 10, 11 and 12 are partial sections of the portion of the mechanism to the left in Fig. 3 but in which the rotatable elements are successively shown at different positions of rotation 90° apart, the rotation being in the direction of the arrows shown in connection therewith and the position of rotation with reference to the position shown in Fig. 3 respectively representing 0°, 90°, 180°, and 270° of movement.

Figure 9:
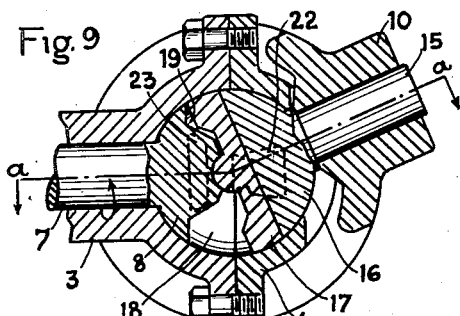
Figure 9A:
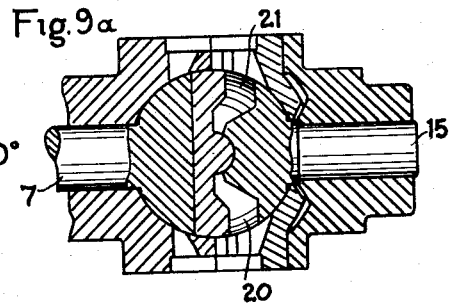
Figure 10:
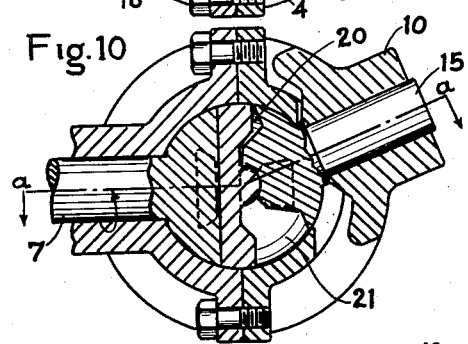
Figure 10A:
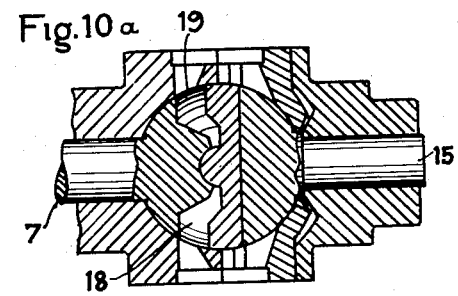

Figs. 9ª, 10ª, 11ª and 12ª are respectively transverse sections along lines a—a of Figs. 9, 10, 11 and 12.

A case or housing generally denoted by the numeral 1 is for convenience of manufacture and assembly constructed in two or more parts, in this instance the two members 3 and 4 which are rigidly fixed together by bolts such as bolt 5. A main chamber 6 is provided in the housing and is of substantially spherical interior form. A shaft 7 rotatably journaled in the housing has fixed upon or integrally formed with its one end a member 8 having surfaces in the direction toward shaft 7 which are complementary to and rotatably but closely fitted to the spherical form of the chamber 6. The opposite end of shaft 7 projects outside the housing and carries a pulley 9 or other means of transmitting power either to or from the shaft 7.

Figure 8:
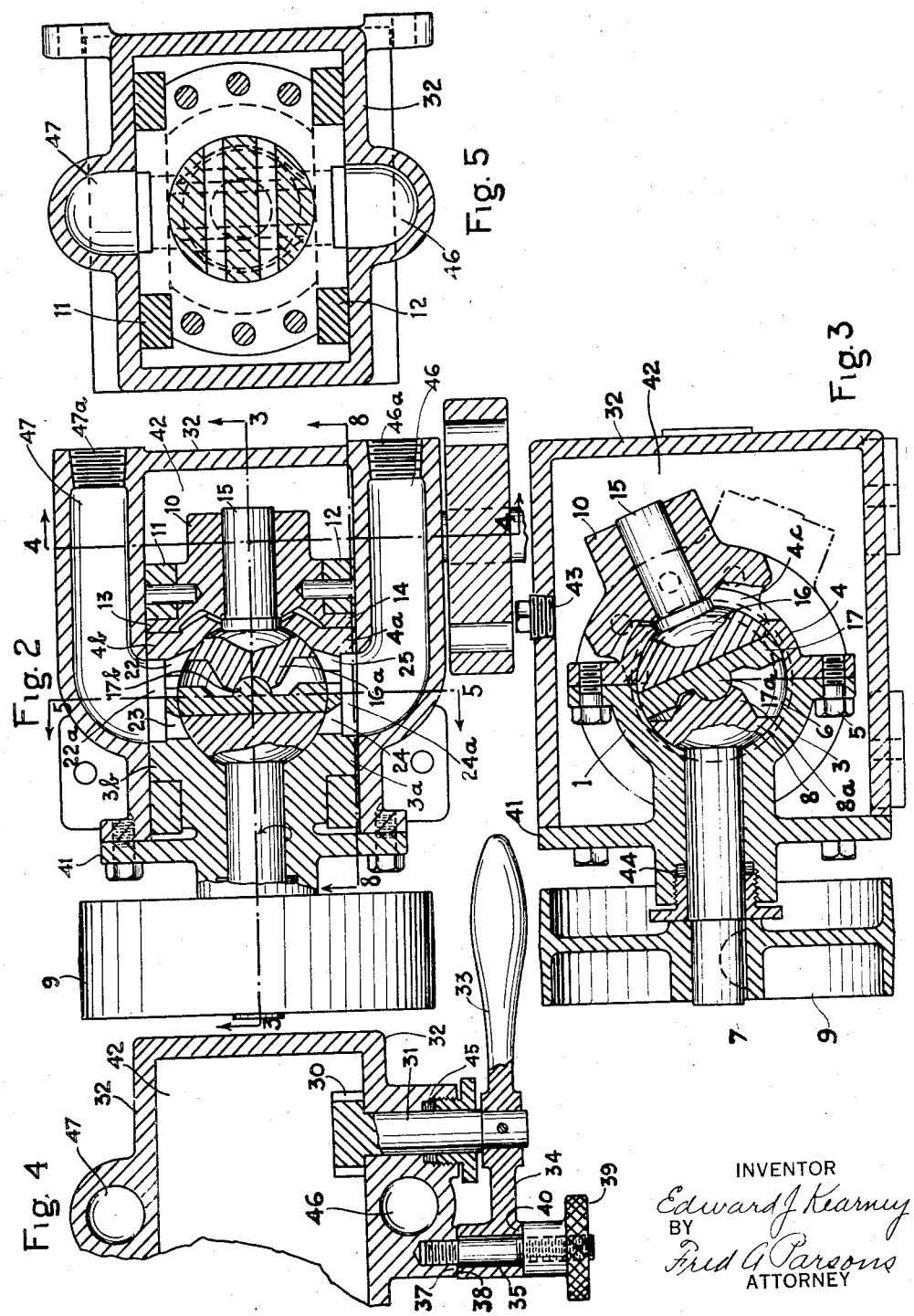
Fig. 8 is an elevation mainly in section along line 8—8 of Fig. 2.

A member 10 is pivoted for movement about an axis of the sphere complementary to the spherical interior of the housing, and is rigidly supported for limited movement about such axis, the member 3 being provided with trunnion portions 3ª and 3ᵇ and member 4 with trunnion portions 4ª and 4ᵇ as shown in Figs. 2 and 8. Fixed with member 10 are the members 11 and 12 in the form of flat annular rings, one side of the bores of which have bearing on the portions 3ª and 3ᵇ, the other side of the bores being closely fitted over ears or extensions 13 and 14 of the member 10 which in turn are fitted to the outside of the portions 4ª and 4ᵇ. The arrangement provides substantial trunnion surfaces for guiding the movement of the member 10 about its axis, and it will be noted that each of the ears 13 and 14 are provided with end faces, illustrated for the ears 14 at 14ª and 14ᵇ in Fig. 8, which are adapted to contact with a face of housing 3 as the member 10 is swung about its axis in opposite directions, forming stops limiting the amount of movement of the member 10.

A shaft 15 is journaled in the member 10 in a position such that the axes of the shaft 7 and shaft 10 are in a common plane whatever the position of adjustment of the member 10 but the shaft 15 may stand at an angle with the axis of the shaft 7 in either direction according to the adjustment of member 10, the axes of the shafts intersecting at the center of the sphere complementary to the chamber 6 and the axis of shaft 15 being vertical to the axis of adjustment of member 10. Within the housing formed by members 3 and 4 and fixed upon or integral with the shaft 15 which projects within the housing is a member 16 having surfaces in the direction of shaft 15 closely but rotatably fitted to the interior of the chamber 6, member 16 being similar to the member 8 but oppositely disposed in the main chamber 6. An intermediate member 17 is pivoted for oscillatory movement relative to the member 8 about an axis coinciding with one of the axes of the sphere complementary to the chamber 6 and vertical to the axis of rotation of member 8 by means of a portion 17ª socketed in a projecting portion 8ª of the member 8 as is more particularly shown in Fig. 3. Member 17 is likewise pivoted for oscillatory movement relative to member 16 about another axis of the sphere complementary to the chamber 6 and vertical to the axis of rotation of member 16, by means of a projecting portion 17ᵇ socketed in a projecting portion 16ª of the member 16. The peripheral surface of the member 17 is of spherical form complementary to the spherical surface of the chamber 6 whereby in any position of the pivoted movement of the member about either axis the member is closely but rotatably fitted within the chamber 6. The construction is such that the member 17 must revolve with the member 8 and shaft 7 as will be apparent from Fig. 3 and must likewise revolve with the member 16 and shaft 15 as will be apparent from Fig. 2, whereby the parts 8, 16 and 17 form a transmission for movement of the one shaft from the other and the several members consisting of shaft 7, members 8, 17 and 16 and shaft 15 must all revolve together, and this will be true whatever the position of adjustment of the member 10 which carries shaft 15 and member 16 with it. An opening 4ᶜ is provided in housing portion 4 through which shaft 15 projects and which is elongated to permit the shaft to move with member 10, but the member 16 is formed to provide a closure for the opening 5ᶜ in any position of adjustment of the shaft. Figs. 9, 10, 11 and 12 illustrate the relative positions of the parts at different positions of rotation when revolved in the direction of the arrow, the position of adjustment of the member 10 being the same as in Fig. 3. The position of the parts at a certain point in such revolution, which may for the present purpose be considered a point of zero revolution, and which corresponds to the position of the parts in Fig. 3, is shown in Figs. 9 and 9ª, Fig. 9ª being as previously explained a transverse section along line a—a of Fig. 9, showing the parts in the same position of revolution, but from a view point 90° removed. It will be seen that four separate chambers are formed by the members 8, 16, 17 within the main chamber 6, the chambers being respectively denoted by the numerals 18, 19, 20 and 21.

During the rotation of the members, the chambers 18, 19, 20 and 21 vary in volume such result being brought about by the relationship of the parts whereby the member 17 is forced to move about each of its axes of oscillation, through a complete forward and backward movement once per revolution. In Fig. 9 for instance, the chamber 18 is in a position of maximum volume and chamber 19 is in a position of minimum volume, while a reference to Fig. 9ᵃ shows that chambers 20 and 21 are at the same time in positions of intermediate volume. As the parts are revolved 90° from the position shown in Fig. 9 in the direction of the arrow to the position shown in Figs. 10 and 10ᵃ, the chamber 18 has contracted to an intermediate volume and chamber 19 has expanded to an intermediate volume while chamber 20 has contracted to a minimum volume and chamber 21 has expanded to maximum volume. As the parts are revolved 90° from the position shown in Fig. 10 to the position shown in Fig. 11, it will be seen that the chamber 18 has contracted to minimum volume, the chamber 19 has expanded to maximum volume, the chamber 20 has expanded to intermediate volume and chamber 21 has contracted to intermediate volume. As the parts are revolved 90° from the position shown in Fig. 11, to the position shown in Fig. 12, it will be seen that the chamber 18 has expanded to intermediate volume, chamber 19 has contracted to intermediate volume, chamber 20 has expanded to maximum volume and chamber 21 has contracted to minimum volume. As the parts are revolved from the position shown in Fig. 12, 90° to complete the revolution and arrive again at the position shown in Fig. 9, it will be seen that the chamber 18 has expanded to maximum volume, the chamber 19 has contracted to minimum volume, chamber 20 has contracted to intermediate volume and chamber 21 has expanded to intermediate volume. Thus it will be seen that during a single revolution of the rotatable elements, each of the chambers 18, 19, 20 and 21 will pass through all the successive stages of expansion and contraction through maximum and minimum volume.

Figure 11:
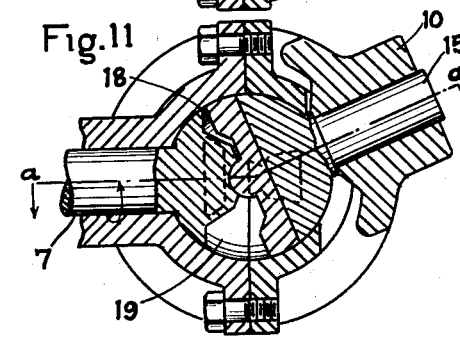
Figure 11A:
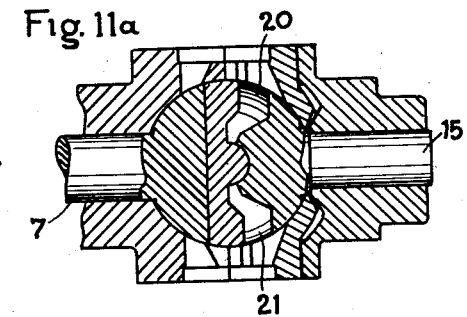
Figure 12:
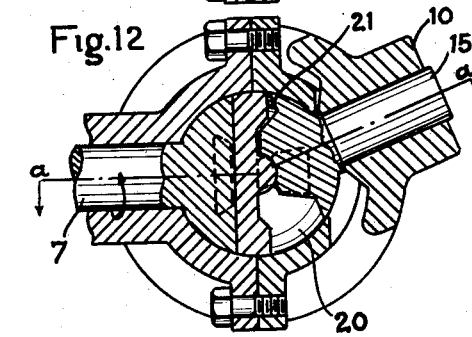
Figure 12A:
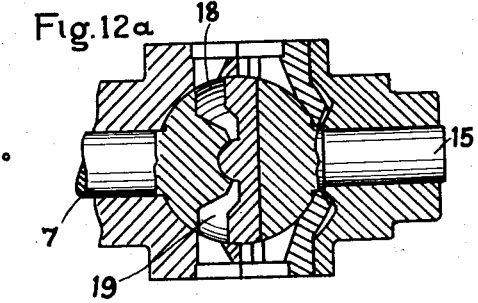

On the one side of the plane common to the axes of the shafts 7 and 15 are a plurality of ports or openings 22 and 23 and on the other side of the same plane are a plurality of ports or openings 24 and 25 (see Fig. 2). An inspection of the various figures will show that during revolution of the parts owing to the form of the members and to the form and position of the ports, the rotation of member 8 will cause the port 23 to be closed away from the chamber 18 at the instant that the chamber reaches its maximum volume as shown in Fig. 9 and again when the chamber reaches its minimum volume as shown in Fig. 11, but it will be apparent that during the contraction of the chamber 18 from the maximum volume to minimum volume, the rotation of the parts causes port 23 to be uncovered to communicate with the chamber, the uncovered area of the port gradually increasing from minimum immediately following the position of rotation shown in Fig. 9 to a maximum uncovered area when the parts are in the position shown in Fig. 10ᵃ, from which position the uncovered port area gradually diminishes until port 23 is again completely closed from the chamber 18 when the chamber reaches the position of minimum volume as shown in Fig. 11. Immediately thereafter the port 24 is opened by the rotation of the parts to the chamber 18 and remains in communication therewith while the chamber passes through its movement of expansion and until it again reaches the position of maximum volume shown in Fig. 9, at which time the chamber 18 is again closed from the port 24 and will immediately thereafter be again in communication with the port 23, the cycle being repeated as long as the parts revolve.

Thus when parts are revolved in the direction of the arrows, chamebr 18 is at all times during its contraction in communication with the port 23 and at all times during its expansion in communication with the port 24 and if fluid is supplied to the port 24, such fluid will be received into the chamber during chamber expansion and will thereafter be dischaged through port 23 during chamber contraction. It is apparent that similarly the chamber 19 will also receive fluid from the port 23 and deliver it through the port 24, the arrangement of the parts being such that chambers 18 and 19 form a pair, the one chamber of which is expanding and in communication with the supply port while the other is contracting and in communication with the delivery port. It is also apparent that the chambers 20 and 21 form a different pair similarly receiving fluid from the port 22 and delivering to the port 25.

It can be shown that during the periods when a small port area is uncovered to the chamber as noted above, the rate of change in chamber volume is relatively very slow, whereby the relatively small port area is ample to provide for fluid movement without undue resistance, while during the period when substantially the entire port area is uncovered to the chamber the rate of change in chamber volume is relatively very rapid.

It is apparent that for each of the pairs of chambers the combined volume of the two chambers forming the pair must remain constant since the one expands as the other contracts by the movement of member 17 which is pivoted symmetrically with relation to each chamber of the pair. It is also obvious that the combined volume of all four chambers, remains constant since the combined volume of the four chambers represents the volume of the spherical chamber, minus the combined space occupied by members 8, 16 and 17, which is the same whatever their position of rotation, or whatever the position of adjustment of member 16. From previous description it may be seen that at all times one of the chambers of each of the pairs is expanding and in communication with a port on one side of the plane common to the shafts 7 and 15, while the other two chambers are contracting and in communication with the ports on the other side of the plane. It can also be shown that the two chambers which are expanding (or contracting) change in volume at rates which, although variable and different for a given chamber at different points in the rotation of the parts, give a substantially constant rate of change in volume for the two chambers combined, owing to the peculiar mechanism employed.

It has thus far been assumed for purposes of explanation that the rotation is in the direction of the arrows shown in Fig. 9, etc., but if the direction of rotation is reversed, the periods of expansion and contraction are likewise reversed, whereby fluid supplied to the ports 24 and 25 is delivered to the ports 22 and 23, the direction of flow of fluid thus depending upon the direction of rotation of the parts. If power is supplied to the pulley 9 for the rotation of the parts and fluid is supplied to the proper ports, fluid under pressure will be expelled from the other ports, the device then functioning as a pump through which fluid may be moved in either direction according to the direction of rotation of the pulley. If fluid under pressure is supplied to the proper ports, the parts will be caused to rotate, discharging fluid from other ports, and power may be drawn from pulley 9 to operate other mechanism, the device then functioning as a motor which may be caused to rotate in either direction according to the ports to which fluid is supplied.

It will be noted that the variation in volume of the chambers 18, 19, 20 and 21 is caused by the angular disposition of the shafts 7 and 15, which causes an oscillation or pivotal movement of member 17 relative to the members 8 and 16. If member 10 is adjusted to a position such that the axes of the shafts lie in the same straight line, as illustrated in Fig. 6, there will be no pivotal movement of member 17 and hence no change in the volume of the chambers during the rotation of the parts, and the device will neither receive nor expel fluid, nor may fluid pass through between the ports since opposite ports are always closed to one another. It will be apparent that in any of the positions of adjustment intermediate between the position shown in Fig. 3 and the position shown in Fig. 6, fluid will be moved through the device but the amount of fluid moved per revolution of the parts will depend upon the adjustment of member 10, being at a maximum when the angle between the axes of the shafts is greatest as shown in Fig. 3 and diminishing in accordance as the angle is diminished since the amount of pivotal movement of member 17 relative to members 8 and 16 is proportional to the change in shaft angles. In other words, the adjustment of member 10 together with shaft 15 and member 16, by changing the relative angles of the axes of shafts 7 and 15, changes the amount or degree of movement of the member 17 about each of its axes of oscillation, thereby changing the amount of fluid displaced in each of the chambers 18, 19, 20, 21 during contraction of the chambers by changing the ratio of maximum and minimum chamber volume, and thus changing the volume of fluid moved by the device for each revolution of the parts.

If the shaft 15 is adjusted from the position shown in Fig. 6 to the position shown in Fig. 7 where the shafts form an angle equal but opposite to the position shown in Fig. 3, fluid will again move through the device in the opposite direction, assuming that the direction of rotation remains the same, and in any position of intermediate adjustment between Fig. 6 and Fig. 7 the movement of fluid will be as before proportional to the angle of adjustment of the shaft 15 relative to shaft 7, but in opposite direction.

The ports 22 and 23, being always of like purpose whether to deliver or receive fluid, both communicate into a single enlarged port 22$^a$. The ports 24 and 25 being always of like purpose whether to deliver or receive fluid both communicate into a single enlarged port 24$^a$.

For the adjustment of member 10, mechanism is provided as follows. The member 12 is provided with gear teeth 12$^a$ on a portion of it periphery as shown in Fig. 8. A pinion 30 engages therewith and is fixed upon or integral with a shaft 31 journaled in a housing 32. Shaft 31 has fixed upon its outer end a hand lever 33 which may be manually moved in one or the other direction, the arrangement being such that the member 10 is thereby moved in the one or the other direction. To retain member 10 in any desired position of adjustment the handle 33 has a slotted extension 34. A stud 35 fixed in the housing 32 passes through the slot 36 of the extension. The housing 32 is provided with a friction surface 37 and the extension 34 with complementary friction surface 38. Stud 35 is provided with a nut 39 threaded thereon which when suitably turned may engage a friction surface 40 on the slotted extension 36, thereby clamping the extension between the nut 39 and the friction surface 37.

The housing 32 together with a plate 41 fixed with housing 1 forms closed chamber 42 which may be filled with fluid by the means of an opening normally closed by a suitable threaded plug 43. At any points where moving members project from the chamber 42 leakage is prevented by means of stuffing boxes of well known construction as at 44 for the shaft 7 and at 45 for the shaft 31.

The chambers formed within housing 1 are by the construction shown, substantially closed except to the proper ports in any position of adjustment or rotation of the parts but certain clearance must exist for the rotation of shaft 15 and member 16, and to prevent leakage of fluid into chamber 42, and for other reasons, the chamber 42 is maintained filled with fluid.

Passages 46 and 47 communicate with the ports respectively on opposite sides of the plane common to the shafts 7 and 15 and are provided with threaded bores 46ª and 47ª to receive pipes for leading fluid to and from the device.

It will be noted that the members 8 and 16 are free for axial movement away from the oscillatory member 17, there being no pivot pins connecting the rotating members. Such movement is limited by the interior housing surfaces, and the thrusts set up by the oscillatory movement tend to move the adjacent surfaces of the members and housing into close relation. This is of particular advantage in that it effectually prevents leakage from the one port to the other between such adjacent surfaces. It has been found that the device should be constructed so that the maximum shifting of member 16 is substantially less than 90 degrees, whereby the maximum angle between the axes of members 8 and 16 is substantially less than 45 degrees. Angles approaching 45 degrees sets up enormous friction losses between the members 8, 16 and 17, and very heavy thrusts between the adjacent surfaces just mentioned causing rapid wear and leakage. Any leakage constitutes a power loss and even with the maximum angle substantially less than 45 degrees it has been found to be material improvement to split the housing along a line transverse to the intersecting axes of members 8 and 16, whereby a predetermined amount of material may be removed from the adjacent surfaces of the separable housing members to compensate for wear, or for the original fitting of the parts to avoid leakage. An angle less than 45 degrees also permits material improvements in arrangement of ports for ample fluid capacity to avoid power loss and to be opened and closed by the rotation of the members, and in providing improved strength and rigidity in the oscillating member and improved pivots for the oscillating movement.

It will be apparent that in the light of this disclosure a variety of modified but equivalent forms of the invention herein shown may be constructed by those familiar with the art each of which it is desired to reserve to the inventor by Letters Patent if within the spirit and scope of the following claims.

I claim:

1. A device of the nature disclosed comprising a housing defining portions of a variable volume chamber, a member relatively oscillatable within said housing to vary the volume of said chamber, and a part relatively rotatable within said housing to oscillate said member; said part being bodily adjustable to change the amount of oscillatory movement of said member.

2. A device of the nature disclosed comprising a housing defining portions of a variable volume chamber, a member relatively oscillatable within said housing to vary the volume of said chamber, a plurality of parts within said housing and respectively rotatable relative thereto about different axes to oscillate said member, one of said parts being bodily adjustable to shift its axis of rotation relative to the axis of rotation of the other part and thereby change the amount of oscillatory movement of said member.

3. A device of the nature disclosed comprising a housing having interior wall surface portions substantially complementary to surface portions of a sphere, a member pivoted for oscillatory movement relative to said housing about an axis of said sphere, a plurality of parts respectively rotatable relative to said housing about different axes intersecting at the center of said sphere, the axis of rotation of the one part being vertical to the axis of oscillatory movement of said member and the other part being bodily adjustable to shift the relative position of its axis of rotation.

4. A device of the nature disclosed comprising a housing having interior wall surface portions forming wall portions of a variable volume chamber and substantially complementary to surface portions of a sphere, a member oscillatable within said housing about an axis of said sphere to vary the volume of said chamber, a plurality of parts rotatable for the oscillation of said member and respectively about different axes intersecting at the center of said sphere, the axis of rotation of one of said parts being vertical to the axis of oscillation of said member, and a movable support for the other of said parts, said support being adjustable about an axis of said sphere to change the oscillatory movement of said member.

5. A device of the nature disclosed comprising a housing having interior wall surface portions forming wall portions of a variable volume chamber and substantially complementary to surface portions of a sphere, a member oscillatable within said housing about an axis of said sphere to vary the volume of said chamber, a plurality of parts rotatable for the oscillation of said member and respectively about different axes of said sphere disposed in a common plane and intersecting at the center of said sphere, inlet and outlet ports respectively on opposite sides of said plane, one of said parts being formed to alternately open the respective ports to said chamber during rotation, and a movable support for the other of said parts, said support being adjustable about an axis of said sphere to change the amount of oscillatory movement of said member.

6. A device of the nature disclosed comprising a variable volume chamber, inlet and outlet ports associated therewith, a first rotatable part, a member rotatable with said part and pivoted for oscillation relative thereto to vary the volume of said chamber, said part being formed to alternately open said chamber to the respective ports during rotation, a second rotatable part connected to move said member in different directions about its pivot respectively when said chamber is open to the respective ports, said second part being bodily movable to shift its axis of rotation whereby to change the degree of oscillatory movement of said member.

7. A device of the nature disclosed comprising a variable volume chamber, inlet and outlet ports associated therewith, a first and second shaft rotatable about different axes, means for actuating the one shaft from the other including a plurality of parts respectively connected with the respective shafts and a member connected to actuate the one part from the other, one of said parts and said member forming wall portions of said chamber relatively movable during rotation to alternately expand and contract the chamber, the last named part being formed to alternately open the respective ports to said chamber during rotation, and a plurality of supports for the different shafts respectively and relatively adjustable to change the volume of fluid displaced during contraction of said chamber.

8. A device of the nature disclosed comprising a plurality of pairs of variable volume chambers, a common wall member defining portions of each of said chambers and pivoted for oscillatory movement about a plurality of different axes intersecting at a common point and respectively for alternately expanding and contracting the chambers of the respective pairs to maximum and to minimum volume, means for the oscillation of said member about both of said axes including a plurality of parts rotatable about different axes located in a common plane, inlet and outlet ports respectively located on opposite sides of said plane, said parts being respectively formed to open the chambers of respective of said pairs to each of said ports alternately during rotation of the parts, one of said parts being adjustable to shift its axis of rotation relative to the axis of rotation of the other of said parts whereby to change the ratio of maximum and minimum volume of each of said chambers.

9. A device of the nature disclosed comprising a housing having interior wall surface portions substantially complementary to surface portions of a sphere, and means for forming four chambers within said housing each alternately expanding and contracting to maximum and minimum volume, said means including a plurality of parts within said housing and rotatable relative thereto, one of said parts being adjustable relative to said housing and to the other of said parts for the purpose of changing the ratio of maximum and minimum volume of said chambers.

10. A device of the nature disclosed comprising a housing having interior wall surface portions substantially complementary to surface portions of a sphere, a plurality of parts within said housing and rotatable about different axes located in a common plane, a plurality of port openings in said housing respectively on opposite sides of said plane, a member rotatable within said housing and pivoted for oscillation relative to respective of said parts about different axes intersecting at the center of said sphere whereby said member and the respective parts form relatively movable wall portions of respective pairs of variable volume chambers, said parts each being formed to open the chambers of the pair associated therewith to said ports alternately during rotation of the parts, one of said parts being adjustable to change the oscillatory movement of said member.

11. A device of the nature disclosed comprising a housing having interior wall surface portions substantially complementary to surface portions of a sphere, two pairs of variable volume chambers within said housing, two parts respectively common to the chambers of the respective pairs and respectively rotatable relative to said housing about different axes positioned in a common plane and intersecting at the center of said sphere, said parts being relatively bodily adjustable to change the relative position of said axes, an inlet and outlet port respectively communicating with the interior of said housing through openings positioned on opposite sides of said plane, said parts being respectively formed to alternately open different of said ports to the chambers of the respective pairs during rotation, a partition member within said housing and rotatable with said parts and pivoted for oscillatory movement relative to the respective parts about different axes of said sphere respectively vertical to the axis of rotation of the respective parts, the opposite sides of said partition member defining wall portions of the different pairs of said chambers respectively.

12. A device of the nature disclosed comprising a housing having interior wall surface portions substantially complementary to surface portions of a sphere, a first shaft journaled in said housing for rotation about an axis of said sphere, a support pivoted for adjustment about an axis of said sphere vertical to the axis of rotation of said first shaft, a second shaft journaled in said support for rotation about an axis vertical to the axis of support adjustment and intersecting the axis of rotation of said first shaft at the center of said sphere when said support is in any position of its adjustment, and means for rotating the one of said shafts from the other including an element rotatble within said housing and forming wall portions of four chambers each variable in volume in accordance with the position of rotation of said element.

13. A device of the nature disclosed comprising a housing having interior wall surface portions substantially complementary to surface portions of a sphere, a first shaft journaled in said housing for rotation about an axis of said sphere, a support pivoted for adjustment about an axis of said sphere vertical to the axis of rotation of said first shaft, a second shaft journaled in said support for rotation about an axis vertical to the axis of support adjustment and in a plane common to the axis of rotation of said first shaft whereby the axes of rotation of said shafts intersect at the center of said sphere in any position of support adjustment, port openings respectively communicating with the interior of said housing on opposite sides of said plane, and means for rotating the one of said shafts from the other including a plurality of parts rotatable within said housing and respectively forming wall portions of different pairs of variable volume chambers, each chamber of both of said pairs being variable in volume in accordance with the position of rotation of said parts, each of said parts being formed to alternately open the different ports to the chambers of one of said pairs during rotation.

14. A device of the nature disclosed comprising a housing having interior wall surface portions substantially complementary to surface portions of a sphere, four variable volume chambers within said housing and having a common wall member, said member being oscillatable about a first axis of said sphere to simultaneously expand the one and contract the other of a pair of said chambers and oscillatable about another axis of said sphere to simultaneously expand the one and contract the other of a different pair of said chambers, whereby the combined volume of the chambers of each of said pairs is substantially constant, and adjustable means for simultaneously oscillating said member about each of said axes at rates proportioned to maintain a substantially constant combined volume for two chambers respectively from different of said pairs in any position of adjustment of said adjustable means.

15. In a device of the nature disclosed, the combination of a housing having interior wall surface portions substantially complementary to surface portions of a sphere, a first shaft journaled in said housing for rotation about an axis of said sphere and projecting within said housing, an adjustable support, means for guiding said support for adjustment about an axis coinciding with an axis of said sphere substantially vertical to the axis of rotation of said first shaft, a second shaft journaled in said support for adjustment therewith and for rotation about an axis substantially vertical to the axis of adjustment of said support and in substantially the same plane as the axis of rotation of said first shaft, said second shaft being extended to project within said housing and said housing being provided with an opening to permit adjustment of said second shaft, and power transmitting mechanism within said housing connecting the one shaft with the other, said mechanism including parts forming wall portions of variable volume chambers, one of said parts being fixed on said second shaft and having surface portions complementary to some of said interior wall surface portions of said housing, whereby the last named part provides a closure for said opening in any position of adjustment of said second shaft.

16. A device of the nature disclosed comprising a housing having interior wall surface portions substantially corresponding to surface portions of a sphere, members rotatable within said housing including a member oscillatable during rotation about a plurality of different axes intersecting at the center of said sphere, whereby to form alternately expanding and contracting chambers, and means to vary the oscillatory movement of the last named member wherby to vary the maximum chamber volume including a shiftable support for one of the other members, said support having guiding trunnion elements spaced apart and respectively at opposite sides of said sphere.

17. A device of the nature disclosed comprising a stationary housing, members rotatable therein about a different axes intersecting at a common point, whereby to form a plurality of chambers alternately expanding and contracting during rotation, means for relative bodily movement of one of said members about an axis passing through said point whereby to vary the maximum volume of said chambers, said means including a support having trunnion members positioned along the last named axis and respectively on opposite sides of said point, said housing providing inlet and outlet port openings positioned respectively on opposite sides of said point.

18. A device of the nature disclosed comprising a stationary housing and members rotatable within said housing including a member oscillatable relative to the other members during rotation whereby to form a plurality of chambers each alternately expanding and contracting during a revolution of said members, all the axes of rotation and of oscillation of said members intersecting at a common point, and means for bodily movement of one of said members about an axis passing through said point; whereby to vary the maximum volume of said chambers.

19. A device as specified in claim 18 in which said housing is provided with port openings positioned respectively on opposite sides of the point of axis intersection and some of said members are formed to alternately open and close said port openings during rotation.

20. A device of the nature disclosed comprising a stationary housing providing a spherical chamber, members rotatable therein including a member oscillatable during rotation whereby to form a plurality of chambers alternately expending and contracting during rotation, and means for bodily shifting one of said members whereby to vary the maximum volume of said plurality of chambers, said housing comprising a plurality of members separably joined along surfaces transverse to the axes of rotation of said members.

21. A device of the nature disclosed comprising a housing having interior wall surface portions substantially corresponding to surface portions of a sphere and providing a port opening, members rotatable within said housing whereby to form chambers alternately expanding and contracting during rotation means for relative bodily movement of one of said members about an axis of said sphere whereby to vary the maximum volume of said chambers, said port opening being of a form in part approximately coinciding to a circle having its center along said axis, one of said members being formed and positioned to alternately open and close said opening during its rotation.

22. A device of the nature disclosed comprising a housing, a plurality of parts spaced apart for rotation therein respectively about different axes intersecting in a common plane, a part rotatably positioned between the other parts and oscillatable relative thereto about different axes respectively, whereby alternately expanding and contracting chambers are formed within said housing during rotation of said parts, said plurality of parts being relatively adjustable about an axis passed through the intersecting axes of revolution whereby to vary the maximum volume of said chambers, said housing providing ports respectively on opposite sides of said plane and alternately brought into communication with said chambers by the rotation of said parts, said plurality of parts being axially movable away from the oscillatory port and said housing providing surfaces adjacent said plurality of parts to limit such axial movement, whereby the thrusts set up by the oscillation of the one part moves said adjacent surfaces closely together to avoid fluid leakage from one to the other port between said adjacent surfaces.

23. A device as specified in claim 22 in which said housing comprises a plurality of members separably joined along surfaces transverse to the axes of said plurality of members whereby to provide adjusting means for wear between said adjacent surfaces.

24. A device as specified in claim 22 in which the relative adjustment of said plurality of parts limits the smaller angle formed between the axes thereof to substantially less than 45 degrees, whereby to limit the thrust pressures between said adjacent surfaces.

25. A device of the nature disclosed comprising a housing a plurality of parts spaced apart for rotation within said housing respectively about different axes intersecting in a common plane, and relatively adjustable through an angle substantially less than 90 degrees, and a part rotatably positioned between the other parts and oscillatable relative thereto about different axes respectively and intersecting at the point of intersection of the axes of said other parts, said housing providing ports respectively on opposite sides of said plane and alternately opened and closed by the revolution of said parts, said housing comprising a plurality of parts separably joined along surfaces transverse to the axes of revolution of said other parts.

In witness whereof, I hereto affix my signature.

EDWARD J. KEARNEY.